United States Patent [19]
Suzuki et al.

[11] 3,899,540
[45] Aug. 12, 1975

[54] HYDROXYLATION PROCESS

[75] Inventors: Takashi Suzuki; Susumu Naito, both of Niigata, Japan

[73] Assignee: Mitsubishi Gas Chemical Company, Ltd., Tokyo, Japan

[22] Filed: Jan. 28, 1974

[21] Appl. No.: 437,242

[30] Foreign Application Priority Data
Jan. 31, 1973 Japan.............................. 48-11889

[52] U.S. Cl...... 260/621 G; 260/612 R; 260/612 D; 260/6 BR; 260/613 D; 260/619 R; 260/619 F; 260/620; 260/621 G; 260/623 R; 260/624 R; 260/625; 260/626 R; 260/626 T
[51] Int. Cl............................................ C07c 37/00
[58] Field of Search ........ 260/612 D, 619 R, 619 F, 260/620, 621 G, 623 R, 624 R, 625, 626 R, 626 T, 612 R, 613 R, 613 D

[56] References Cited
UNITED STATES PATENTS

| | | | |
|---|---|---|---|
| 2,499,515 | 3/1950 | Fren.............................. | 260/621 G |
| 3,377,386 | 4/1968 | Chafetz......................... | 260/621 G |
| 3,407,237 | 10/1968 | Vesely............................ | 260/624 R |
| 3,453,332 | 7/1969 | Vesely et al. .................. | 260/613 R |
| 3,481,989 | 12/1969 | Vesely et al. .................. | 260/619 R |

*Primary Examiner*—Bernard Helfin
*Assistant Examiner*—Norman Morgenstern
*Attorney, Agent, or Firm*—Armstrong, Nikaido & Wegner

[57] ABSTRACT

Hydroxylated aromatic compounds such as phenols are prepared by reacting one or more aromatic compounds with hydrogen peroxide in the presence of trifluoroacetic acid and hydrogen fluoride at a temperature of from −70°C to +50°C.

5 Claims, No Drawings

HYDROXYLATION PROCESS

This invention relates to a process for introducing one or more hydroxyl groups into the nucleus of an aromatic compound. More particularly, this invention relates to a process for hydroxylating an aromatic compound comprising treating the aromatic compound with hydrogen peroxide in the presence of trifluoroacetic acid and hydrogen fluoride.

Hydroxylated aromatic compounds such as phenols have been prepared by alkali fusion of a sulfonate, acid decomposition of a hydroperoxide, hydrolysis of an aryl halide, and the like. But there are many disadvantages in these processes in that a large amount of alkali or acid is necessary, it is very difficult to prepare higher phenols other than cresol, and the like. Recently various processes have been proposed on hydroxylation of an aromatic compound using hydrogen peroxide. Typical examples of these processes are (1) by means of $H_2O_2$—$BF_3$ (J. Org. Chem. 27, 24 (1962)), (2) by means of $H_2O_2$—HF (Japanese Pat. Publication Sho 45-13092 (13092/1970)) and (3) by means of $H_2O_2$—$AlCl_3$ (J. Org. Chem. 36, 3184 (1971)). But there are many defects in these processes in that, according to the processes (1) and (3) using $BF_3$ or $AlCl_3$ as catalyst, since equimolar or more catalyst is required due to the production of water during the hydroxylation, it is very difficult to recover the catalyst used, and according to the process (2), selectivity of the reaction product is poor although the recovery of the catalyst used is very easy, the yield based on hydrogen peroxide is low, sufficient results can hardly be obtained, and the like.

It is an object of this invention to provide a process for hydroxylating an aromatic compound using hydrogen peroxide overcoming many defects of the previously proposed processes. It is another object of this invention to provide a process for introducing one or more hydroxyl groups into the nucleus of an aromatic compound by one step reaction. It is a further object of this invention to provide a process suitable for a commercial scale production of hydroxylated aromatic compounds. Further objects and advantages of this invention will be apparent to one skilled in the art from the accompanying disclosure and discussion.

In accordance with this invention, hydroxylated aromatic compounds are prepared by reacting one or more aromatic compounds with hydrogen peroxide in the presence of trifluoroacetic acid and hydrogen fluoride. In the present invention, hydrogen peroxide is activated by the catalyst of trifluoroacetic acid and hydrogen fluoride, the hydroxylation of an aromatic compound can be carried out at a low temperature for a short period, and the selectivity for the hydroxylated compound is very high, so that the desired compound can be obtained in high yield.

Aromatic compounds such as aromatic hydrocarbon and derivatives thereof can widely be used in the present invention. Preferable examples of the aromatic compounds are as follows:

Benzene; alkylbenzenes such as toluene, p-t-amyltoluene, o-xylene, p-xylene, m-xylene, mesitylene, cumene, pseudocumene, hemimellitene, durene, isodurene, prehnitene, pentamethylbenzene, ethylbenzene, 1-ethyl-2-methylbenzene, 1-ethyl-3-methylbenzene, 1-ethyl-4-methylbenzene, 1-ethyl-2,3-dimethylbenzene, 1-ethyl-2,4-dimethylbenzene, 1-ethyl-2,5-dimethylbenzene, 1-ethyl-2,6-dimethylbenzene, 1-ethyl-3,4-dimethylbenzene, 1-ethyl-3,5-dimethylbenzene, 1-ethyl-2,3,4-trimethylbenzene, 1-ethyl-2,3,5-trimethylbenzene, 1-ethyl-2,3,6-trimethylbenzene, 1-ethyl-2,4,6-trimethylbenzene, 1-ethyl-2,4,5-trimethylbenzene, 1-ethyl-3,4,5-trimethylbenzene, 1-ethyl-3,4,6-trimethylbenzene, 1-ethyl-2,3,4,5-tetramethylbenzene, 1-ethyl-2,3,4,6-tetramethylbenzene, 1-ethyl-2,3,5,6-tetramethylbenzene, isopropylbenzene, 1-methyl-2-isopropylbenzene, 1-methyl-3-isopropylbenzene, 1-methyl-4-isopropylbenzene, 1,2-dimethyl-3-isopropylbenzene, 1,3-dimethyl-4-isopropylbenzene, 1,4-dimethyl-3-isopropylbenzene, 1,3-dimethyl-2-isopropylbenzene, 1,2-dimethyl-4-isopropylbenzene, 1,3-dimethyl-5-isopropylbenzene, 1,2,3-trimethyl-4-isopropylbenzene, 1,3,4-trimethyl-5-isopropylbenzene, 1,2,4-trimethyl-3-isopropylbenzene, 1,2,4-trimethyl-5-isopropylbenzene, 1,3,5-trimethyl-2-isopropylbenzene, 1,2,3-trimethyl-5-isopropylbenzene, 1,2,3,4-tetramethyl-5-isopropylbenzene, 1,2,3,5-tetramethyl-6-isopropylbenzene, 1,2,4,5-tetramethyl-3-isopropylbenzene, t-butylbenzene, 1-t-butyl-3-methylbenzene, 1-t-butyl-4-methylbenzene, 1-t-butyl-3,4-dimethylbenzene, 1-t-butyl-3,5-dimethylbenzene, 1-t-butyl-3,4,5-trimethylbenzene, p-t-butyltoluene, di-t-butylbenzene, t-amylbenzene, t-hexylbenzene; phenol; alkylphenols such as o-cresol, m-cresol, p-cresol, 2,3-dimethylphenol, 2,4-dimethylphenol, 2,5-dimethylphenol, 2,6-dimethylphenol, 3,4-dimethylphenol, 3,5-dimethylphenol, 2,3,5-trimethylphenol, 2,3,6-trimethylphenol, 2,4,6-trimethylphenol, 2,3,4-trimethylphenol, p-t-butylphenol, p-t-amylphenol, p-t-hexylphenol, o-t-butylphenol, o-t-amylphenol; dihydroxylated phenols such as hydroquinone, catechol, resorcinol; biphenyl and its alkylated derivatives such as 2,2'-dimethylbiphenyl, 2,3'-dimethylbiphenyl, 2,4'-dimethylbiphenyl, 3,3'-dimethylbiphenyl, 3,4'-dimethylbiphenyl, 4,4'-dimethylbiphenyl, 2-methylbiphenyl, 3-methylbiphenyl, 4-methylbiphenyl; naphthalene; alkylnaphthalenes such as α-methylnaphthalene, β-methylnaphthalene, 2,6-dimethylnaphthalene, 2,7-dimethylnaphthalene, 1,6-dimethylnaphthalene, t-butylnaphthalene, t-amylnaphthalene; naphthol and its alkylated derivatives such as 1-t-butyl-2-naphthol, 1-t-amyl-2-naphthol, 1-t-hexyl-2-naphthol; anthracene and its alkylated derivatives such as t-butylanthracene, t-amylanthracene, t-hexylanthracene, t-heptylanthracene, t-octylanthracene; anthrol and its alkylated derivatives such as 1-t-butyl-2-anthrol, 1-t-amyl-2-anthrol, 1-t-hexyl-2-anthrol; phenanthrene and its alkylated derivatives such as t-butylphenanthrene, t-amylphenanthene, t-hexylphenanthene, t-heptylphenanthene, t-octylphenanthrene; phenanthrol and its alkylated derivatives such as 1-t-butyl-2-phenantrol; alkoxybenzenes such as methoxybenzene, ethoxybenzene; methylanisole; halogenated benzene derivatives such as chlorotoluene, bromotoluene, chloroethylbenzene; and the like.

In view of the foregoing, it may be seen that aromatic compounds suitable for use in the present invention include, generally, aromatic hyrocarbons which may be substituted by lower alkyl, lower alkoxy, halogen and hydroxy.

The aromatic compounds as mentioned above can be used alone or in admixture, or with aliphatic hydrocarbons or halogenated hydrocarbons inert to the hydroxylation.

Hydrogen fluoride, one component of the catalyst, containing water may be used. The concentration of hydrogen fluoride is generally 70% by weight or more, preferably 80% by weight or more.

The concentration of trifluoroacetic acid, which is the other component of the catalyst, is generally 80% by weight or more, preferably 85% by weight or more.

The concentration of hydrogen peroxide is generally 30% by weight or more, preferably 50% by weight or more.

The hydroxylation reaction may be carried out at a temperature between +50°C and −70°C, preferably between +10°C and −30°C.

Any pressure that can maintain the catalyst and a mixture of an aromatic compound and hydrogen peroxide in a liquid phase may be used.

In the case of monohydroxylation of an aromatic compound, the aromatic compound may preferably be used in excess of hydrogen peroxide. Further in order to increase the yield based on hydrogen peroxide, hydrogen perixode is used in a molar ratio to an aromatic compound 1.0 or less, preferably 0.9 or less. In the case of polyhydroxylation of an aromatic compound, it is preferable to use a relatively large amount of hydrogen peroxide, preferably 1.0 – 2.0 moles per mole of an aromatic compound.

Trifluoroacetic acid may be used 1 mole or more, preferably 1.5 moles or more per mole of hydrogen peroxide. Hydrogen fluoride is generally used 5– 50 moles preferably 10 – 30 moles per mole of hydrogen peroxide. Hydrogen fluroide is generally used 5 – 20 moles per mole of trifluoroacetic acid. In order to carry out the reaction more smoothly, it is preferable to use 1 mole or more of hydrogen fluoride per mole of water at the completion of the reaction.

Under the reaction conditions as mentioned above, hydrogen peroxide can react quantitatively for 5 – 30 minutes to yield the corresponding hydroxylated aromatic compound from the starting aromatic compound.

The hydroxylated compound obtained is subjected to distillation, extraction or neutralization to remove the catalyst and is separated and purified by a conventional method.

The phenols obtained by the process of the present invention are very important intermediates in chemical industries and are used for producing various plastics, antioxidants, dyes, agricultural chemicals, antibacterial agents, and medicines such as vitamines.

The following examples will serve further to illustrate the present invention.

EXAMPLE 1 m-Xylene (21.2 g, (0.20 mole)) and 51.4 g (2.57 moles) of anhydrous hydrogen fluoride were placed in a 200-ml autoclave equipped with a stirrer and were cooled below −20°C with stirring passing a refrigerant through the jacket. A mixture obtained by dissolving 4.2 g of a 90% by weight hydrogen peroxide solution (corresponding to 0.11 mole of hydrogen peroxide) in 21.3 g (0.18 mole) of trifluoroacetic acid was added dropwise to the autoclave under an atmospheric pressure. Since the addition of the hydrogen peroxide solution accompanies much generation of heat, the amount of the recycling refrigerant and the addition of the hydrogen peroxide solution were controlled so as to maintain the reaction temperature below −15°C. The dropwise addition of the hydrogen peroxide solution took 10 minutes. After the completion of the addition of the hydrogen peroxide solution, stirring was continued for 10 minutes. The contents were taken out of the autoclave into ice water. The organic matter in the reaction mixture was extracted with benzene and dried by a conventional method. According to the gas chromatographic analysis, xylenol was obtained in 97 mole % yield based on the used hydrogen peroxide. The xylenol contained 63 mole % of 2,4-xylenol, 34 mole % of 2,6-xylenol and 3 mole % of 3,5-xylenol.

EXAMPLE 2

Under the same reaction conditions as described in Example 1 except for using 26.0 g (1.30 moles) of anhydrous hydrogen fluoride, the hydroxylation was carried out. Xylenol was obtained in 95 mole % yield based on the used hydrogen peroxide. The xylenol contained 71 mole % of 2,4-xylenol and 29 mole % of 2,6-xylenol.

EXAMPLE 3

A similar autoclave as described in Example 1 was used. Cumene (24.0 g, 0.20 mole), 32.6 g (0.28 mole) of trifluoroacetic acid and 50.0 g (2.50 moles) of anhydrous hydrogen fluoride were placed in the autoclave. A mixture of 4.1 g of a 90% by weight hydrogen peroxide solution (corresponding to 0.11 mole of hydrogen peroxide) and 15.0 g (0.13 mole) of trifluoroacetic acid was added dropwise to the contents of the autoclave with vigorous stirring for 15 minutes controlling the reaction temperature below =10°C. Stirring was continued for 30 minutes after the completion of the addition of the mixture. Isopropylphenol, the molar ratio fo o-isomer: p-isomer being 38 : 62, was obtained in 40% yield based on hydrogen peroxide.

EXAMPLES 4 – 9

Using a similar procedure to that described in Example 1, hydroxylations of various aromatic compounds were carried out. The results were as shown in Table 1.

Table 1

| Example No. | 4 | 5 | 6 | 7 | 8 | 9 |
|---|---|---|---|---|---|---|
| Aromatic compound | Mesitylene | p-Xylene | Toluene | Ethyl-benzene | 1,3-Dimethyl-5-isopropyl-benzene | 1,2,4-Trimethyl-5-isopropyl-benzene |
| Reacted amount (mole) | | | | | | |
| Aromatic compound | 0.18 | 0.20 | 0.21 | 0.20 | 0.17 | 0.14 |
| $H_2O_2$ | 0.12 | 0.11 | 0.11 | 0.11 | 0.10 | 0.10 |
| HF | 1.34 | 2.71 | 2.50 | 2.50 | 2.50 | 2.50 |

Table 1 — Continued

| Example No. | 4 | 5 | 6 | 7 | 8 | 9 |
| --- | --- | --- | --- | --- | --- | --- |
| $CF_3COOH$ | 0.18 | 0.18 | 0.18 | 0.38 | 0.35 | 0.42 |
| Reaction temperature (°C) | -15 | +10 | -15 | -15 | -15 | -15 |
| Reaction time (min.) | 30 | 20 | 30 | 30 | 30 | 30 |
| Yield based on $H_2O_2$ (mole %) | 98 | 92 | 55 | 53 | 95 | 99 |
| Isomer composition, o-isomer: p-isomer (mole %) | | | | 72:28 | 53:47 | |

EXAMPLES 10 – 15

Using a similar procedure to that described in Example 1, hydroxylation of various compounds as listed in Table 2 was carried out. After the reaction, the whole amount of the reaction mixture was placed in a distillation apparatus made of anticorrosive material together with 200 ml of benzene and heated. After distillating the catalyst consisting of hydrogen fluoride and trifluoroacetic acid and the water produced during the reaction with benzene, the resulting benzene solution was analyzed by the gas chromatography. The results were as shown in Table 2.

Table 2

| Example No. | 10 | 11 | 12 | 13 | 14 | 15 |
| --- | --- | --- | --- | --- | --- | --- |
| Aromatic compound | Phenol | Anisole | Dimethyl naphthol | Mesitylene | Benzene | m-Xylene *1 / Mesitylene *2 |
| Reacted amount (mole) | | | | | | |
| Aromatic compd. | 0.21 | 0.23 | 0.20 | 0.17 | 0.20 | *1 0.25 / *2 0.25 |
| $H_2O_2$ | 0.11 | 0.12 | 0.11 | 0.25 | 0.11 | 0.20 |
| HF | 2.50 | 2.58 | 2.60 | 2.60 | 2.50 | 2.64 |
| $CF_3COOH$ | 0.13 | 0.13 | 0.15 | 0.14 | 0.25 | 0.30 |
| Reaction temp. (°C) | 25 | -10 | -5 | -20 | +5 | -20 |
| Reaction time (min.) | 30 | 30 | 20 | 20 | 20 | 30 |
| Yield based on $H_2O_2$ (mole %) | 73 | 69 | 60 | 68 | 30 | 95 |
| Product composition o-isomer: p-isomer (mole %) | 37:63 | 40:60 | --- | Monohydroxylate 55; Dihydroxylate 45 | | Xylenol 18 / Mesitol 82 |

The following Comparative Examples 1 and 2 show the effect of hydrogen fluoride or trifluoroacetic acid used alone as catalyst.

Comparative Example 1

In an autoclave similar to that used in Example 1, 35.6 g (0.31 mole) of trifluoroacetic acid and 21.2 g (0.20 mole) of m-xylene were placed and stirred vigorously. A mixture of 4.2 g of a 90% by weight hydrogen peroxide solution (corresponding to 0.11 mole of hydrogen peroxide) and 14.9 g (0.12 mole) of trifluoroacetic acid was added dropwise to the autoclave. The reaction temperature was maintained below −10°C by means of a refrigerant. It took 15 minutes to add the mixture. After carring out the reaction for additional 30 minutes, the reaction mixture was treated and analyzed as described in Example 1. The yield of xylenol based on hydrogen peroxide was 22 mole %. The ratio of 2,4-xylenol to 2,6-xylenol was 70 : 30.

This result apparently shows the high activity of the catalyst used in the present invention.

Comparative Example 2

In the autoclave, 24.0 g (0.20 mole) of cumene and 50.0 g (2.50 mole) of anhydrous hydrogen fluoride were placed. While stirring vigorously, 4.1 g of a 90% by weight hydrogen peroxide solution (0.11 mole of $H_2O_2$) was added to the autoclave for 10 minutes. The reaction temperature was maintained below 0°C. After the addition of the hydrogen peroxide solution, the resulting mixture was allowed to stand for 5 minutes. A large amount of resinous material insoluble in both water and benzene was formed in the reaction mixture. The yield of isopropylphenol based on hydrogen peroxide was 5 mole %.

What is claimed is:

1. A process for preparing a hydroxylated aromatic compound which comprises reacting at least one aromatic compound selected from the group consisting of unsubstituted aromatic hydrocarbons and aromatic hydrocarbons substituted with lower alkyl, lower alkoxy, halogen and hydroxy with hydrogen peroxide in the presence of trifluoroacetic acid and hydrogen fluoride at a temperature of from −70°C. to +50°C.; at least one mole of trifluoroacetic acid and 5 to 50 moles of hydrogen fluoride being employed per mole of hydrogen peroxide.

2. A process according to claim 1, wherein 1 mole or less of hydrogen peroxide is used per mole of the aromatic compound in the case of monohydroxylation.

3. A process according to claim 1, wherein 1 mole or more of hydrogen peroxide is used per mole of the aromatic compound in the case of polyhydroxylation.

4. A process according to claim 1, wherein the aromatic compound is an alkylbenzene.

5. A process according to claim 1, wherein the aromatic compound is o-, p- or m-xylene.

* * * * *